United States Patent [19]

Chion et al.

[11] 4,363,895

[45] Dec. 14, 1982

[54] SOLUTIONS, WHICH CAN BE SHAPED, FROM MIXTURES OF CELLULOSE AND POLYAMIDE-IMIDE, AND SHAPED ARTICLES OBTAINED

[75] Inventors: Pierre Chion, Bron; Jacques Menault, Charbonnieres-les-Bains; Henry Rodier, Sainte-Foy-les-Lyon, all of France

[73] Assignee: Rhone-Poulenc-Textile, Paris, France

[21] Appl. No.: 244,135

[22] Filed: Mar. 16, 1981

[30] Foreign Application Priority Data

Mar. 14, 1980 [FR] France .............................. 80 06069

[51] Int. Cl.³ .................. C08L 79/08; C08G 73/14; C08L 1/02; D01F 8/02
[52] U.S. Cl. .................. 525/54.21; 526/238.21; 106/163 R; 106/165; 106/187; 106/203; 264/184; 264/186; 264/194; 428/361; 428/375; 536/57; 536/84
[58] Field of Search .................. 260/9, 30.8 DS; 264/184, 186, 194; 106/163 R, 165, 187, 203; 428/361, 375; 536/57, 84; 525/54.21, 54.23; 526/238.21; 527/311, 313, 314

[56] References Cited

U.S. PATENT DOCUMENTS

| | | | |
|---|---|---|---|
| 2,481,692 | 9/1949 | Schlosser et al. | 536/57 |
| 3,123,647 | 3/1964 | Duennenberger et al. | 106/165 |
| 3,499,810 | 3/1970 | Wagle | 428/361 |
| 3,673,160 | 6/1972 | Buisson et al. | 260/78 TF |
| 4,129,640 | 12/1978 | Rodier | 264/187 |
| 4,145,391 | 3/1979 | Rodier | 264/83 |
| 4,173,613 | 11/1979 | Rodier | 264/187 |
| 4,237,274 | 12/1980 | Leoni et al. | 536/57 |
| 4,314,959 | 2/1982 | Leoni et al. | 106/163 R |

*Primary Examiner*—John Kight, III
*Assistant Examiner*—Nathan M. Nutter
*Attorney, Agent, or Firm*—Murray and Whisenhunt

[57] ABSTRACT

The present invention relates to new polymer solutions which make it possible to produce shaped articles, such as yarns and fibres, films, sheets and the like.

These solutions consist of cellulose having a degree of polymerisation of at least 200, polyamide-imide, dimethyl sulphoxide and formaldehyde, with a weight ratio cellulose/polyamide-imide of 0.05 to 1, preferably 0.1 to 1, a ratio formaldehyde/cellulose of 0.2 to 2 and a total concentration of 6 to 25%, preferably 15 to 20%.

These solutions are particularly suitable for the production of filaments which consist of fibrils substantially orientated along the axis of the fibre and closely intersecting, the cellulose macromolecules being partially involved in a crystal lattice characteristic of cellulose II. The filaments possess valuable properties for use in textiles.

20 Claims, No Drawings

SOLUTIONS, WHICH CAN BE SHAPED, FROM MIXTURES OF CELLULOSE AND POLYAMIDE-IMIDE, AND SHAPED ARTICLES OBTAINED

The present invention relates to new solutions which can be shaped and which are capable of being converted to yarns, fibres, films, membranes, pellicules and the like, and to a process for their production. It also relates to the yarns and fibres obtained from these solutions and to the process for the production of the said yarns and fibres.

More particularly, the present invention relates to solutions, which can be shaped, containing cellulose and a polyamide-imide, the process for their production and the shaped articles obtained from these solutions.

These solutions which can easily be shaped consist of: cellulose having a degree of polymerisation of at least 200, polyamide-imide, dimethyl sulphoxide and formaldehyde; in these solutions, the weight ratio cellulose/polyamide-imide is between 0.05 and 1, the weight ratio formaldehyde/cellulose is between 0.2 and 2 and the total polymer concentration of the solutions is between 6 and 25% by weight.

To produce yarns and fibres, it is generally preferred to use solutions having a polymer concentration of between 15 and 20% by weight and a water content which is less than or equal to 5,000 ppm, and having a weight ratio cellulose/polyamide-imide of between 0.1 and 1.

The invention also relates to a process for the production of the solutions which can be shaped, according to the present invention, by adding polyamide-imide to a solution, in a mixture of dimethyl sulphoxide (DMSO) and formaldehyde, of cellulose having a degree of polymerisation of at least 200, which has been dried beforehand, the total polymer concentration being between 6 and 25% and the weight ratio cellulose/polyamide-imide being between 0.05 and 1; the polyamide-imide can be in powder form or already in solution in the dimethyl sulphoxide.

The present invention relates to filaments, fibres and yarns based on cellulose and polyamide-imide in a weight ratio cellulose/polyamide-imide of between 0.05 and 1, preferably between 0.1 and 1, in which each polymer is in the form of fibrils substantially orientated along the axis of the fibre and closely intersecting with one another, the cellulose macromolecules being partially involved in a three-dimensional crystal lattice characteristic of cellulose II.

The yarns and fibres according to the invention also possess a water retention capacity of at least 20%, preferably at least 30%, determined in accordance with DIN Standard Specification 53-814.

Finally, the present invention relates to a process for the production of the said yarns and fibres by wet spinning of the solutions according to the invention, in which the total polymer concentration is between 6 and 25%, into a coagulating bath consisting of 25 to 80% of water and 75 to 20% by volume of dimethyl sulphoxide, the said bath being kept at between 0° and 40° C., orientating the filaments, removing the solvent and overstretching the said filaments.

For the preparation of the solutions according to the invention, it is possible to use cellulose I, referred to as native cellulose, originating from any source, for example from cotton linters or wood pulp, or cellulose II possessing a degree of polymerisation of at least 200, originating, for example, from waste fibres or films of regenerated cellulose or alkali cellulose, which has been neutralised and washed.

The polyamide-imides according to the present invention are in the film forming molecular weight range and consist of:

amide-imide linkages (A) of the formula:

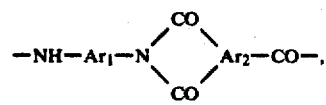

amide linkages (B) of the formula:

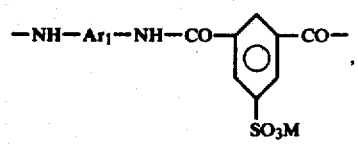

if appropriate, and amide linkages (C) of the formula:

if appropriate, in which linkages: $Ar_1$ represents a divalent aromatic radical, preferably containing two non-fused aromatic rings, preferably phenyl rings linked by an oxygen atom or a methyl group, which may be substituted by one or more lower alkyl preferably methyl groups, such as

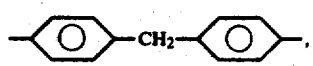

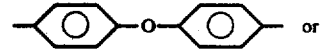

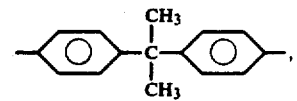

$Ar_2$ represents a trivalent aromatic radical, such as

R represents a divalent aromatic radical preferably containing a single aromatic ring, such as

M represents an alkali metal or alkaline earth metal and the linkages (B), if they are present, represent at least 3% of the total number of the linkages A, B and C.

Suitable polyamide-imide polymers are disclosed in commonly assigned U.S. Pat. No. 3,673,160, the disclosure of which is hereby incorporated by reference for the teaching of such polymers therein.

The starting cellulose, having a degree of polymerisation of at least 200, is cut up, dried, if necessary, and then subjected to preliminary swelling in DMSO, dried beforehand if appropriate. Formaldehyde in the form of paraformaldehyde is then added and the temperature is raised to a value which is preferably between 90° and 140° C., in accordance with the process described in commonly assigned U.S. Pat. No. 4,129,451, the disclosure of which is hereby incorporated by reference for the teaching of such process therein.

The weight ratio formaldehyde/cellulose largely depends on the cellulose used. It is generally preferable to use a formaldehyde/cellulose ratio which is the higher, the lower the availability of the cellulose employed. In practice, for dissolving cellulose I, it is preferable to use a formaldehyde/cellulose ratio of at least 1, whereas, in the case of cellulose II, it is possible to use a ratio of at least 0.6 at the dissolution stage.

To facilitate the subsequent conversion, this ratio can then be reduced, if appropriate, to a value of between 0.2 and 2 by removing the formaldehyde by any known means, such as entrainment by a preferably inert, anhydrous gas, or distillation under reduced pressure, without the risk of gel formation or coagulation, provided, however, that the formaldehyde/cellulose ratio remains equal to at least 0.2.

Preferably, the formaldehyde used in the present invention is in the form of paraformaldehyde.

It is also desirable for the water content of the various reactants to be low, for example for the water content of the cellulose to be less than 1%, that of the dimethyl sulphoxide to be less than or equal to 1% and that of the paraformaldehyde to be less than 4% by weight.

The solutions according to the invention can be used for the production of very diverse articles, such as yarns, fibres, films, sheets, coatings, pellicules and the like.

The solutions which are suitable for spinning are those having a total polymer concentration of between 6 and 25%, preferably between 15 and 20%, in which the cellulose/polyamide-imide ratio is between 0.05 and 1 and which has a water content of less than 5,000 ppm. However, in order to carry out industrial spinning economically and to produce fibres with good characteristics, this polymer concentration will be at least 15%, preferably between 15 and 20%, and the cellulose/polyamide-imide ratio will be between 0.1 and 1. The said solutions can be dry spun in accordance with any process known to those skilled in the art, for example in accordance with commonly assigned U.S. Pat. No. 4,145,391, the disclosure of which is hereby incorporated by reference for the disclosure of the dry spinning process therein. In this case, the polyamide-imide used preferably contains only linkages A and C as defined above. Preferably, the solutions are spun into a coagulating bath essentially consisting of water and dimethyl sulphoxide in respective proportions of between 25/75 and 80/20 by volume, the bath being kept at a temperature between 0° and 40° C. The filaments are subjected to molecular orientation, which can be carried out in the coagulating bath from 0.3 to 1.1X, preferably 0.5 to 0.7X or subsequently, by stretching in one or more stages from 1.2 to 2X, preferably 1.4 to 1.6X, for example in air, in an aqueous bath or in both in succession, and then overstretching from 1.1 to 2.4X, preferably 1.8 to 2.1X at a temperature above 280° C., these drawing ratios depending on the cellulose content. In the case where the solutions according to the invention are wet spun, the polyamide-imide must contain linkages (B).

After they have left the coagulating bath, the filaments are freed of the solvent by washing with water before, during or after stretching. The washing can also be carried out by means of dilute ammonia solutions in order to prevent the strands from sticking. Subsequently, the filaments can advantageously be washed with water and then sized, dried and overstretched.

The yarns and fibres according to the present invention comprise polyamide-imide fibrils substantially orientated in the direction of the axis of the fibre and closely intermixed with cellulose fibrils which are substantially orientated along the axis of the fibre, the cellulose macromolecules being partially involved in a three-dimensional crystal lattice characteristic of cellulose II.

The yarns and fibres thus obtained simultaneously possess a good absorption capacity, a good dyeing affinity and excellent antistatic properties, and also good fastness to light, especially UV light. It is surprising to find that the articles derived from mixtures of cellulose and polyamide-imide retain their mechanical characteristics even after prolonged exposure to light, whereas the articles of polyamide-imide alone lose some of their properties under the same conditions.

The water retention capacity of the said said yarns and fibres is determined in accordance with DIN Standard Specification 53-814. It is at least 20%, preferably at least 30%. In general, it is between 20 and 80%, more particularly between 30 and 80%, whereas that of the polyamide-imide fibres containing no cellulose is of the order of 10%. This characteristic makes the fibres very comfortable to wear by rapidly absorbing the body moisture, which can then evaporate from the surface of the textile.

Starting from solutions according to the invention, it is also possible to obtain films, sheets, pellicules and the like, in accordance with any known process.

The following examples, in which the parts and percentages are by weight, unless indicated otherwise, are given by way of indication, but without implying a limitation, in order to illustrate the invention.

EXAMPLE 1

A. A solution is prepared, which contains 19% by weight, in dimethyl sulphoxide, of a polyamide-imide consisting of 80% of amide-imide units of the formula:

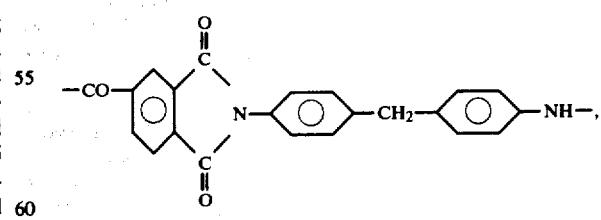

16% of amide units of the formula:

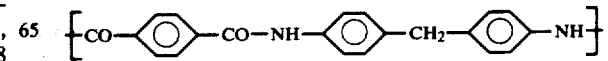

and 4% of units:

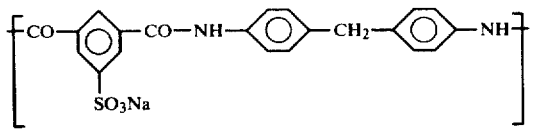

having an inherent viscosity of 1.0 measured from a 0.5% by weight solution in N-methylpyrrolidone at 25° C.

B. A 6% strength by weight cellulose solution in dimethyl sulphoxide is prepared separately in the following manner:

106 g of Viscokraft pulp, having a degree of polymerisation of 450 and a moisture content of 6%, are dried and then introduced into 1,440 g of dimethyl sulphoxide containing 500 ppm of water. 125 g of 96% pure paraformaldehyde are added (paraformaldehyde/cellulose ratio: 1.20).

The mixture is heated for 5 hours at 135° C., whilst stirring. After dissolution, part of the paraformaldehyde is removed by bubbling a stream of dry nitrogen through at 120° C., which lowers the paraformaldehyde/cellulose ratio to 0.35.

Starting from solutions A and B, three solutions (solutions C, D and E), respectively containing 10%, 30% and 50% by weight of cellulose, relative to the polyamide-imide, are prepared by mixing and are then spun and compared with solution A used as a control.

The four solutions are spun under the following conditions:

spinerette: 64 orifices each of diameter 0.06 mm
coagulating bath: DMSO/water in proportions of 63/37 by volume at 23° C.

|  | filaments A | filaments C | filaments D | filaments E |
|---|---|---|---|---|
| stretching in air | 1.33 | 1.3 | 1.3 | 1.3 |
| washing with water in countercurrent | yes | yes | yes | yes |
| stretching in boiling water |  | 1.1 | 1.1 | 1.1 |
| drying in dryer, °C. | 100 | 100 | 100 | 100 |
| overstretching on heated rollers |  |  |  |  |
| temperature °C. | 300 | 300 | 300 | 300 |
| ratio | 1.8 | 1.25 | 1.25 | 1.25 |

The results obtained are as follows:

|  | filaments A | filaments C | filaments D | filaments E |
|---|---|---|---|---|
| gauge per strand in dtex | 3.3 | 3.3 | 3.3 | 3.3 |
| primary swelling, % | 250 | 300 | 300 | 300 |
| secondary swelling, % (after 15 minutes in boiling water) | 14 | 24 | 30 | 35 |
| water retention capacity (DIN Standard Specification 53-814), % | 11 | 26-28 | 32-35 | 55 |
| moisture uptake in a standard atmosphere (22° C. ± 2° at 65% relative humidity) | 3.2 | 4.2 | 5.8 | 7.6 |

EXAMPLE 2

1. A solution, which contains 15% by weight, in dimethyl sulphoxide, of a polyamide-imide as described in Example 1A, is prepared by dissolution in the cold for 2 hours, whilst stirring.

2. An 8% strength cellulose solution in dimethyl sulphoxide is prepared separately in the following manner:

240 g of Viscokraft pulp, having a degree of polymerisation of 450 and a moisture content of 6%, are dried and then introduced into 2,472 g of dimethyl sulphoxide containing 500 ppm of water. 288 g of 96% pure paraformaldehyde are added (paraformaldehyde/cellulose ratio: 1.2).

This mixture is heated for 6 hours at 135° C., whilst stirring. After dissolution, part of the paraformaldehyde is removed by degassing under air for 1 hour at 130° C., and this lowers the paraformaldehyde/cellulose ratio to a level of 0.46.

Part of the two solutions is malaxated in the cold for one hour and they are heated at 80° C. for one hour in a double-walled reactor heated by steam.

Part of the two solutions 1 and 2 are thus mixed so as to give solutions G, H, I and J, in which the cellulose/polyamide-imide ratios are respectively 0.1, 0.3, 0.5 and 0.8.

After filtration, all these solutions are spun through a spinerette possessing 64 orifices of diameter 0.55 mm, into a coagulating bath which consists of dimethyl sulphoxide and water in a ratio of 60/40 by volume, and which is kept at ambient temperature. The resulting filaments are then treated in the following manner:

|  | G | H | I | J |
|---|---|---|---|---|
| stretching in air, ratio | 1.4 × | 1.2 × | 1.3 × | 1.2 × |
| washing | water + NH4OH at a concentration of 30 g/liter | | | |
| drying on rollers, temperature °C. | 320 | 320 | 320 | 320 |
| overstretching in air: temperature °C. | 320 | 320 | 320 | 320 |
| ratio | 2.1 × | 1.4 × | 1.1 × | 1.1 × |
| total stretching ratio | 2.9 × | 1.7 × | 1.4 × | 1.3 × |

After sizing, the filaments thus obtained possess the following properties:

|  | G | H | I | J | polyamide-imide control yarn |
|---|---|---|---|---|---|
| overall gauge, dtex | 150 | 171 | 216 | 254 | |
| tensile strength, g/tex | 26.7 | 16.2 | 11.6 | 12.6 | |
| elongation, % | 11 | 14.2 | 3.8 | 3.9 | |
| modulus, g/tex | 584 | 647 | 649 | 738 | |
| water retention capacity (DIN Standard Specification 53-814), % | 22 | 33 | 35 | 42 | 10 |
| fastness to light according to DIN 54-004 (for 120 hours) loss of strength, % | 60 | 33 | 61 | 20 | 71 |

We claim:
1. Shapable polymer solution comprising
(A) cellulose having a degree of polymerization of at least 200
(B) polyamide-imide
(C) dimethyl sulphoxide, and
(D) formaldehyde,
the weight ratio of cellulose/polyamide-imide being between about 0.05 and about 1, the weight ratio of formaldehyde/cellulose being between about 0.2 and about 2 and the total polymer concentration being between about 6 and about 25% by weight.

2. Solutions according to claim 1, characterised in that the polyamide-imide contains amide-imide linkages (A) of the formula:

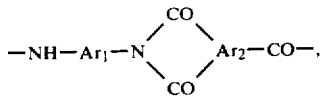

in which Ar$_1$ represents a divalent aromatic radical and Ar$_2$ represents a trivalent aromatic radical.

3. Solutions according to claim 2, characterised in that the polyamide-imide also contains amide linkages of the formula:

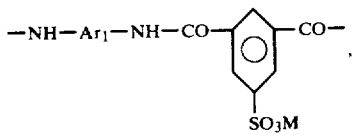

in which Ar$_1$ represents a divalent aromatic radical and M represents an alkali metal or alkaline earth metal.

4. Solutions according to one of claims 2 or 3, characterised in that the polyamide-imide contains amide linkages (C) of the formula:

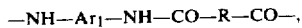

in which R represents a divalent aromatic radical.

5. Solutions according to claim 1, characterised in that the total polymer concentration is between 15 and 20%.

6. Solutions according to claim 1, characterised in that the water content of said solution is less than 5,000 ppm.

7. Solutions according to claim 1, characterised in that the cellulose/polyamide-imide ratio is between 0.1 and 1.

8. Process for the production of solutions which can be shaped, according to claim 1, characterised in that the polyamide-imide is added to a solution, in a mixture of dimethyl sulphoxide and formaldehyde, of cellulose having a degree of polymerisation of at least 200, which has been dried beforehand, with a weight ratio cellulose/polyamide-imide of between 0.05 and 1.

9. Process according to claim 8, characterised in that the polyamide-imide is in powder form.

10. Process according to claim 8, characterised in that the polyamide-imide is in the form of a solution in dimethyl sulphoxide.

11. Process according to claim 8, wherein the weight ratio of formaldehyde/cellulose at the end of said process is between about 0.2 and about 2.

12. Process according to claim 8, wherein the concentration of cellulose in the mixture of dimethyl sulphoxide and formaldehyde, and the amount of said polyamide-imide added to said solution, is such that the total polymer concentration in the resulting solution is between about 6 and about 25% by weight.

13. Fibers, filaments and yarns based on cellulose and polyamide-imide, wherein the weight ratio of cellulose/polyamide-imide is between 0.05 and 1, and each polymer is in the form of fibrils whose axis is substantially oriented along the axis of the fiber, the fibrils being intermingled, and wherein at least part of the cellulose macromolecules are involved in a 3-dimensional crystal lattice characteristic of cellulose II.

14. Yarns and fibres according to claim 13, characterised in that they have a water retention capacity of at least 20%, determined in accordance with DIN Standard Specification 53-814.

15. Yarns and fibres according to claim 13, characterised in that their water retention capacity is at least 30%.

16. Process for the production of yarns and fibers according to claim 13, wherein a solution consisting of cellulose having a degree of polymerization of at least 200, a polyamide-imide polymer, dimethylsulfoxide and formaldehyde, having a weight ratio of cellulose/polyamide-imide of between 0.05 and 1, a weight ratio of formaldehyde/cellulose of between 0.2 and 2, and a total polymer concentration of between 6 and 25 percent by weight, is spun into a coagulating bath consisting essentially of 25 to 80 percent by volume of water and 75 to 20 percent by volume of dimethylsulfoxide, the coagulating bath being at a temperature between 0° and 40° C., thereafter orienting the filaments, removing solvent from the filaments, and overstretching the filaments at a temperature above 280° C.

17. Process according to claim 16, characterised in that the solution has a total polymer concentration of between 15 and 20%.

18. Process according to claim 16, characterised in that the filaments are orientated by stretching.

19. Process according to claim 16, characterised in that the filaments are washed with water.

20. Process according to claim 16, characterised in that the filaments are washed by means of a dilute aqueous ammonia solution.

* * * * *